(12) United States Patent
Campetella

(10) Patent No.: US 10,551,037 B2
(45) Date of Patent: Feb. 4, 2020

(54) LIGHTING DEVICE AND SCENOGRAPHIC PROJECTOR COMPRISING A PLURALITY OF SUCH LIGHTING DEVICES

(71) Applicant: CLAY PAKY S.p.A., Seriate (IT)

(72) Inventor: Francesco Campetella, Pesaro (IT)

(73) Assignee: CLAY PAKY S.P.A., Seriate (IT)

( * ) Notice: Subject to any disclaimer, the term of this patent is extended or adjusted under 35 U.S.C. 154(b) by 434 days.

(21) Appl. No.: 15/245,561

(22) Filed: Aug. 24, 2016

(65) Prior Publication Data

US 2017/0059133 A1  Mar. 2, 2017

(30) Foreign Application Priority Data

Aug. 26, 2015  (IT) .................. 102015000046526

(51) Int. Cl.
  *F21V 14/04* (2006.01)
  *F21V 5/04* (2006.01)
  *F21V 7/04* (2006.01)
  *F21V 7/05* (2006.01)
  *F21V 13/04* (2006.01)
  *F21V 8/00* (2006.01)

(52) U.S. Cl.
  CPC ............... *F21V 14/04* (2013.01); *F21V 5/04* (2013.01); *F21V 7/04* (2013.01); *F21V 7/05* (2013.01); *F21V 13/04* (2013.01); *G02B 6/0096* (2013.01)

(58) Field of Classification Search
  CPC .......... F21V 14/04; F21V 5/04; F21V 7/0033; F21V 7/04; F21V 7/05; F21V 13/04
  USPC ............................................ 362/551
  See application file for complete search history.

(56) References Cited

U.S. PATENT DOCUMENTS

| 4,931,916 | A | 6/1990 | Callahan | |
|---|---|---|---|---|
| 6,416,183 | B1 * | 7/2002 | Colpaert | G02B 7/005 353/101 |
| 9,146,340 | B2 * | 9/2015 | Lavizzari | F21V 7/0033 |
| 2010/0290229 | A1 * | 11/2010 | Meyer, Sr. | F21V 14/06 362/282 |
| 2013/0301291 | A1 * | 11/2013 | Lavizzari | F21V 7/0033 362/555 |

FOREIGN PATENT DOCUMENTS

| CN | 102518959 | 6/2012 |
|---|---|---|
| EP | 2 650 605 | 10/2013 |

* cited by examiner

*Primary Examiner* — Mary Ellen Bowman
(74) *Attorney, Agent, or Firm* — Leason Ellis LLP

(57) ABSTRACT

A lighting device for producing scenographic light effects has a light source mounted on the frame; a light guide coupled to the light source to define an optical path along a longitudinal axis; a first mirror (5) arranged along the longitudinal axis facing the light source to reflect the light beam towards the light source; a second mirror movable with respect to the frame and facing the first mirror to reflect the light beam reflected by the first mirror.

23 Claims, 7 Drawing Sheets

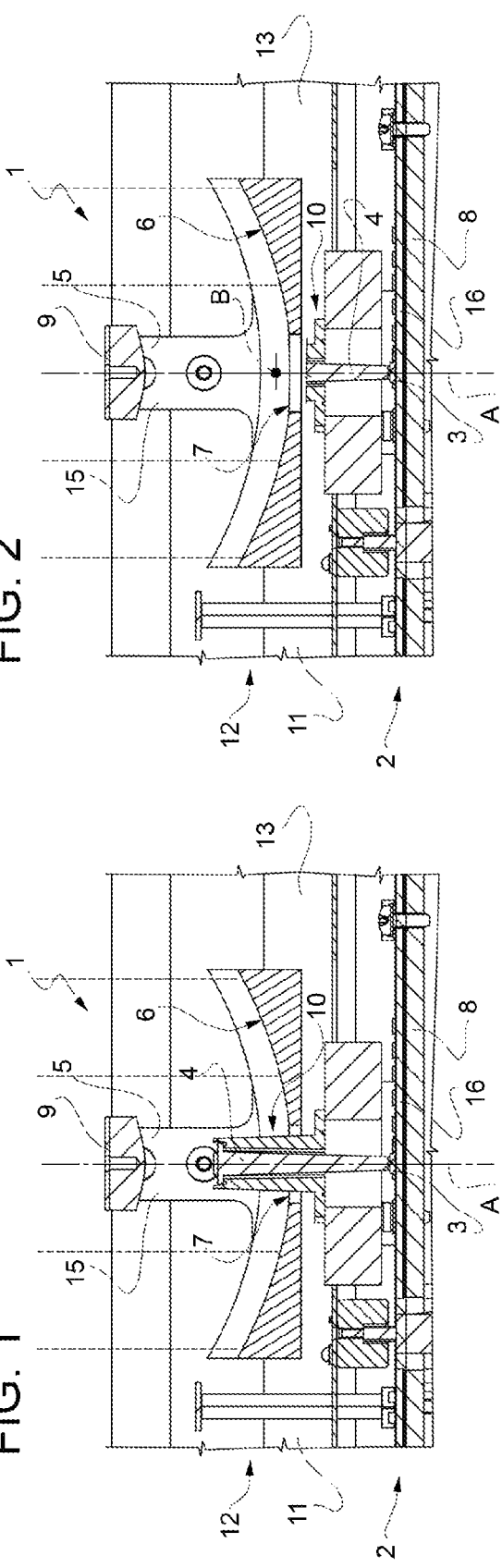
FIG. 1
FIG. 2
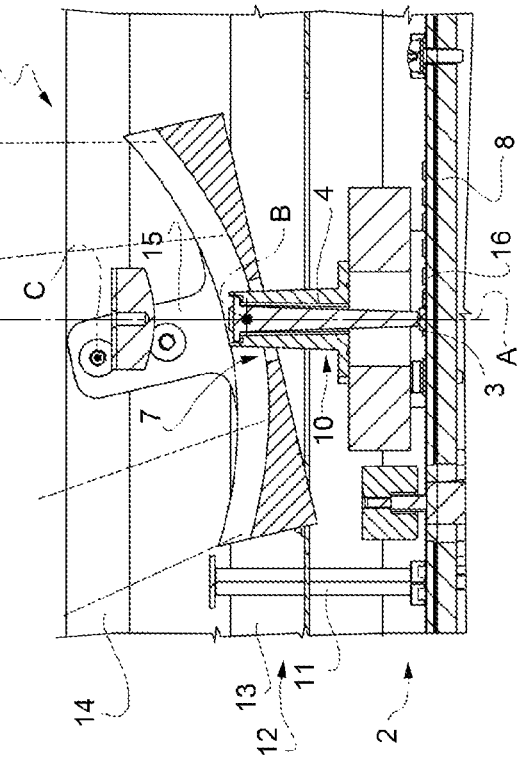
FIG. 3
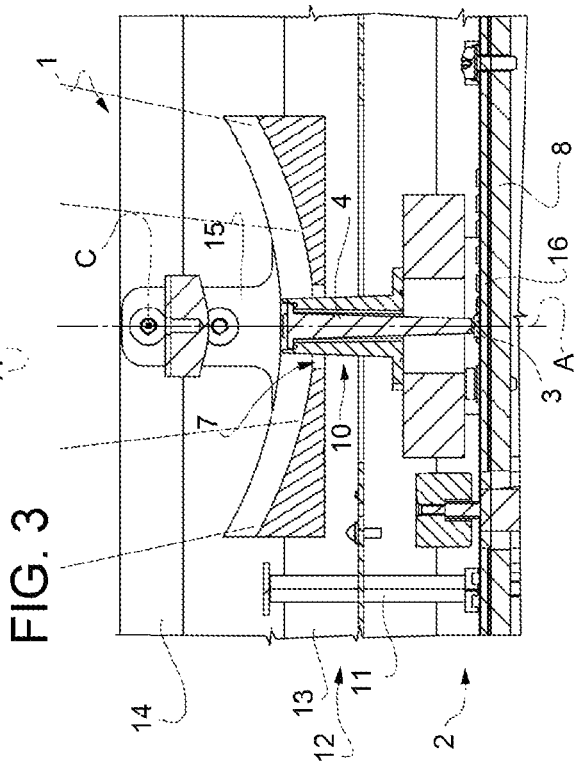
FIG. 4

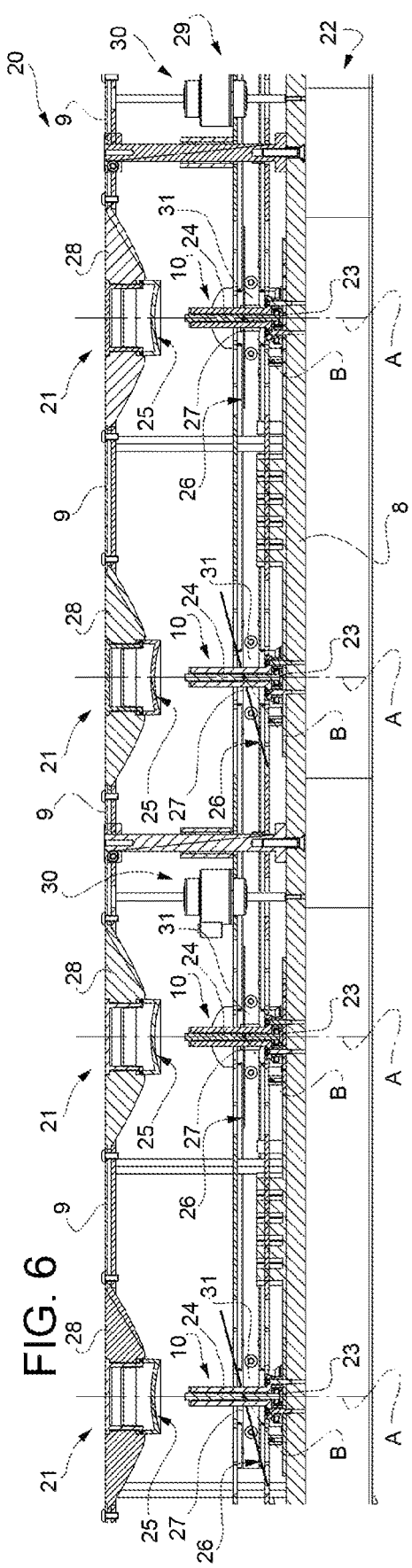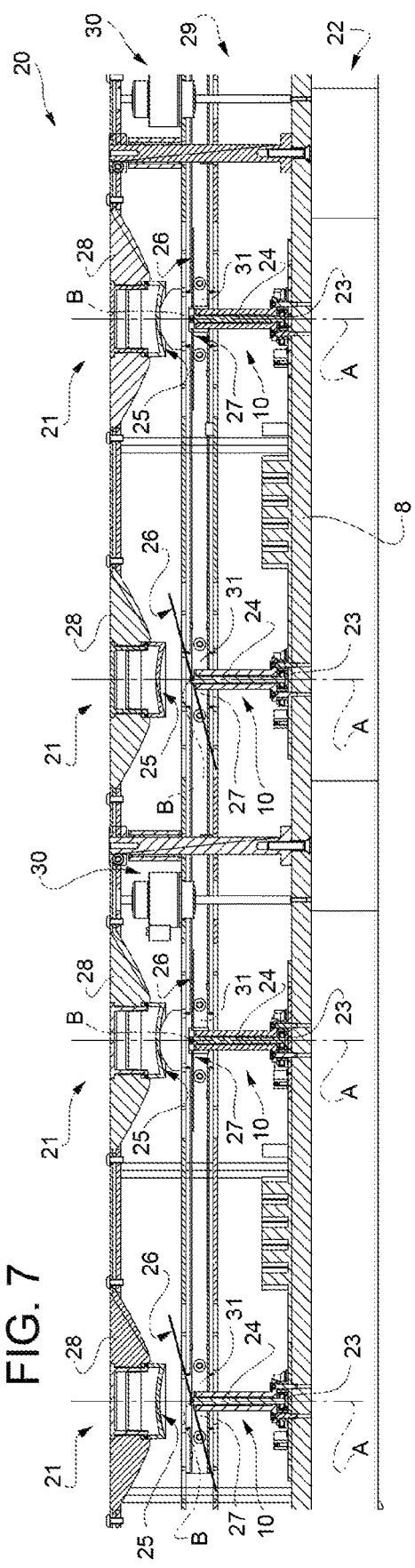

LIGHTING DEVICE AND SCENOGRAPHIC PROJECTOR COMPRISING A PLURALITY OF SUCH LIGHTING DEVICES

CROSS-REFERENCE TO RELATED PATENT APPLICATIONS

The present application claims the benefit of priority under 35 U.S.C. § 119 of Italian patent application serial No. 102015000046526, filed Aug. 26, 2015, which is hereby incorporated by reference in its entirety.

TECHNICAL FIELD

The present invention relates to a lighting device for producing scenographic light effects.

BACKGROUND OF THE INVENTION

The aforesaid lighting devices are used in the entertainment industry to obtain scenographic effects with play of lights produced by light beams. The entertainment industry is constantly searching for new plays of light. To this purpose, a modification of shape, orientation and colouring of the light beam by means of optical systems treating the light beam is already known. These optical systems are based on different principles and have different technical characteristics and potential. However, the current optical systems for treating light beams share a common need of heavy and bulky structural elements, which make more difficult the handling, the installation and the transportation of the optical lighting devices.

SUMMARY OF THE INVENTION

An object of the present invention is to provide a lighting device of the aforesaid type that is extremely versatile and is free from the drawbacks of the known art.

According to the present invention, it is provided a lighting device for producing scenographic light effects, the lighting device comprising a frame; a light source mounted on the frame; a light guide coupled to the light source to define an optical path along a longitudinal axis; a first mirror arranged along the longitudinal axis, facing the light source to reflect the light beam towards the light source; a second mirror movable with respect to the frame and facing the first mirror to reflect the light beam reflected by the first mirror. In this way, the shape and the orientation of the light beam may be varied by moving the second mirror between the light source and the first mirror.

In particular, the second mirror has a central opening to be arranged about the light guide. This configuration allows a particularly compact and space-saving lighting device.

In particular, the second mirror is movable along the longitudinal axis to vary the distance between the first and the second mirror and, accordingly, the opening of the light beam reflected by the second mirror. In fact, the opening of the light beam is function of the distance between the focus of the first and of the second mirror.

In particular, the second mirror is orientable with respect to the longitudinal axis to direct the light beam reflected by the second mirror in a direction diverging from the longitudinal axis. The orientation of the second mirror is achievable in any position of the mirror along the longitudinal axis and it is therefore possible to obtain a combination of effects: opening/closing of the light beam and orientation of the light beam.

According to a variant of the present invention, the first mirror has an opening, which extends along the longitudinal axis and is configured to allow the passage of a part of the beam coming out of the light guide.

In this way, a part of the light beam maintains a constant shape and extends along the longitudinal axis, while a part of the beam is processed. This decomposition of the beam therefore originates new scenographic effects.

According to a further variant, the first mirror can be tilted with respect to the longitudinal axis, in particular the rotation of the first mirror is opposite to the rotation of the second mirror.

The rotation of the first mirror allows an improvement of the reflection when the second mirror is tilted.

According to an embodiment of the present invention, the lighting device includes a projection lens configured to intercept the light beam reflected by the second mirror. The projection lens allows a greater freedom of choice with regard to the shape of the first and of the second mirror.

According to a variant, the projection lens may be oriented with respect to the longitudinal axis, in particular the rotation of the projection lens is coaxial to and concordant with the rotation of the second mirror, and larger than the rotation of the second mirror.

This allows an improvement of the beam quality.

According to an embodiment of the present invention, the first mirror is a convex mirror, while the second mirror is a concave mirror.

According to another embodiment, the first mirror is a concave mirror, while the second mirror is a flat mirror.

In particular, the frame comprises a base for supporting the light source and a structure integral with the base and configured to support the first mirror facing the light source. In other words, along the longitudinal axis the lighting device is confined between the base and the structure.

In particular, the frame comprises a tubular element integral with the base and configured to house the light guide.

In general, the frame defines all of the support elements for the optical components of the lighting device.

The frame further comprises guides parallel to the longitudinal axis to guide the moving parts, i.e. the second mirror.

In particular, the lighting device includes a control mechanism, movable relative to the frame and configured to support and move the second mirror along the longitudinal axis and to tilt the second mirror with respect to the longitudinal axis.

In particular, the control mechanism comprises at least a first actuator to move the second mirror along the longitudinal axis and at least a second actuator to tilt the second mirror with respect to the longitudinal axis.

According to the present invention, the lighting device comprises an actuation assembly for rotating the second mirror about two axes, mutually incident and transverse to the longitudinal axis.

Thanks to the actuation assembly, the beam may be oriented in any direction.

The present invention has the further object to provide a scenographic projector, which is free from the drawbacks of the prior art.

According to the present invention, a scenographic projector for creating scenographic light effects is provided, the scenographic projector comprising a plurality of lighting devices, each of which is formed according to any one of the aforesaid characteristics.

In particular, the second mirrors are moved simultaneously and in the same way.

According to another embodiment, the second mirrors are moved independently of each other.

BRIEF DESCRIPTION OF THE DRAWINGS

Further characteristics and advantages of the present invention will become clear from the following description of its non-limiting examples of embodiments, with reference to the figures of the accompanying drawings, in which:

FIG. 1 is an elevational view, with parts removed for clarity's sake and parts in section, of a first embodiment of the lighting device according to the present invention in a first operating position;

FIG. 2 is an elevational view, with further parts removed for clarity's sake and parts in section, of the lighting device of FIG. 1;

FIGS. 3 and 4 are elevational views, with parts removed for clarity's sake, of the lighting device of FIG. 1, respectively in a second and in a third operating position;

FIGS. 6 and 7 are views in elevation, with parts removed for clarity's sake and on a reduced scale, of a scenographic projector in two operating positions and according to a second embodiment of the present invention;

DETAILED DESCRIPTION OF THE INVENTION

Figure 5:
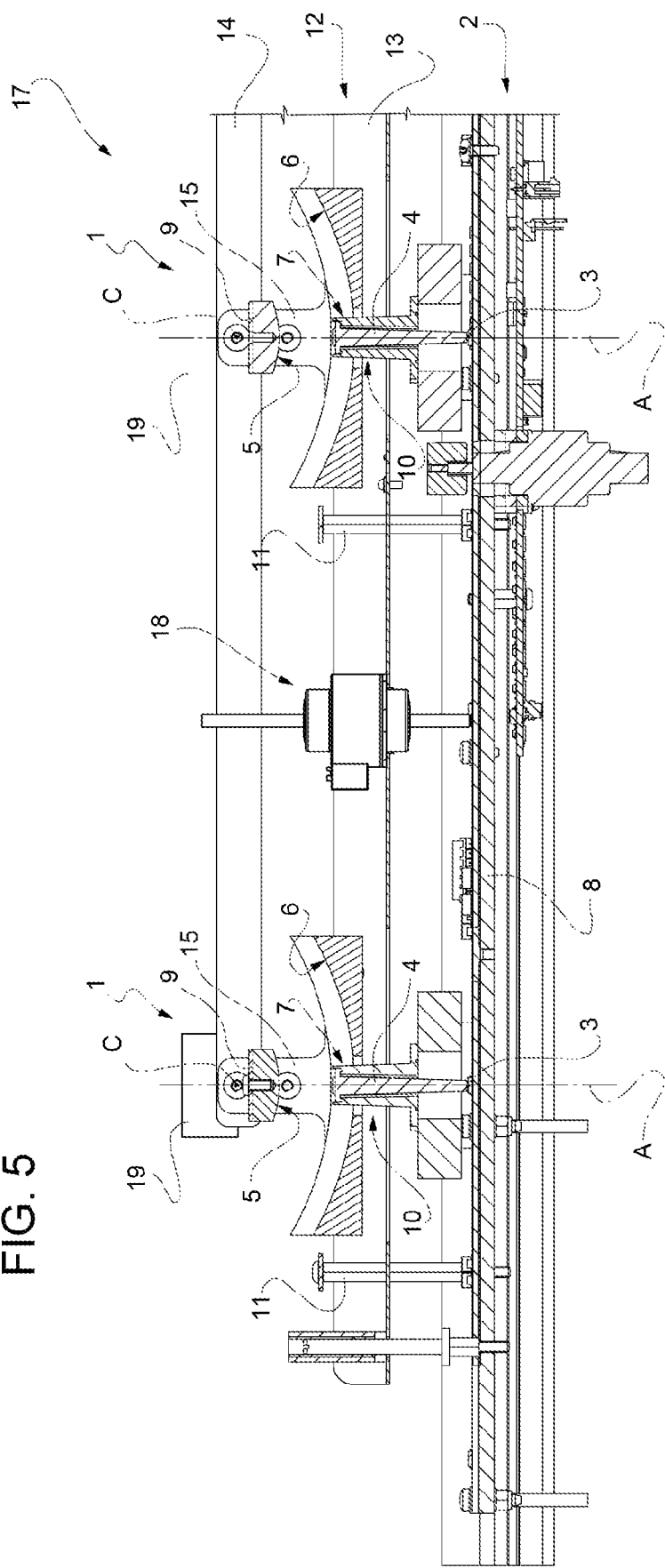
FIG. 5 is a sectional view, with parts removed for clarity's sake, of a scenographic projector comprising two lighting devices manufactured as in the previous Figures.

FIG. 1 indicates with the reference number 1 a lighting device for producing scenographic light effects by manipulating the light beam. The lighting device comprises a frame 2; a light source 3 mounted on the frame 2; a light guide 4 coupled to the light source 3 to define an optical path along a determined axis A; a mirror 5 arranged along the determined axis A facing the light source 3 to reflect the light beam towards the light source 3; a mirror 6 movable with respect to the frame 2 and facing the mirror 5 to reflect the light beam reflected by the mirror 5.

In the present case, the light source 3 comprises one or more LEDs. In the case where the light source 3 comprises more LEDs, it is able to confer to the light beam an infinite range of colours.

According to a not shown variant of the present invention, the light source comprises one or more laser diodes.

Furthermore, in the present case the light guide 4 is an optical mixing tube.

In a variant of the present invention, the light guide 4 has a phosphorus converter at its end with respect to the light source.

The mirror 6 has a central opening 7 that allows arranging the mirror 6 about the light guide 4.

Moreover, the mirror 6 is movable along the longitudinal axis A, as shown in FIG. 3, in order to vary the opening of the light beam reflected by the mirror 6.

In the embodiment shown in FIG. 1, the lighting device 1 defines a substantially tubular, or at most with an opening of about 2°, light beam. In this embodiment, the mirror 6 is arranged in a stroke end position and is not able to move further away from the mirror 5.

As the mirror 6 comes closer to the mirror 5, the beam widens, as shown in the embodiment of FIG. 3.

With reference to FIG. 2, the mirror 6 is orientable about a further axis B, transverse to the determined axis A so as to direct the light beam reflected by the mirror 6 along preferential optical paths.

In FIG. 4, the mirror 6 is raised with respect to the end position and is oriented about the axis B to combine the effect of changing the shape of the beam with the effect of orienting the light beam about the axis B.

In the example shown in FIGS. 1 to 4, the mirror 5 is a convex mirror, while the mirror 6 is a concave mirror.

The frame 2 comprises a base 8 for supporting the light source 3 and a structure 9, which is integral with the base 8, and is configured to support the mirror 5 facing the light source 3 or better facing the free end of the light guide 4. The frame 2 comprises a tubular element 10 fixed to the base 8 and configured to house the light guide 4.

The frame 2 also includes the guides 11, only one of which is shown in FIGS. 1 to 4, and which are supported by the base 8 and extend parallel to the longitudinal axis A.

The lighting device includes a control mechanism 12 coupled to the guides 11 and to the mirror 6 for controlling the position along the longitudinal axis A and the inclination of the mirror 6 with respect to the longitudinal axis A.

In the example shown, the control mechanism 12 comprises a rod 13 slidingly connected with the guides 10, a rod 14 parallel to the rod 13 and a lever 15, which is hinged to the rod 13 around the axis B, and is hinged to the rod 14 around an axis C parallel to the axis B. The lever 15 is integral with the mirror 6 and the orientation of the lever 15 around the axis B determines the orientation of the mirror 6. The rod 14 is configured to rotate the lever 15 around the axis B through minor shifts, substantially in the direction D1.

The base 8 also supports the electronic cards 16 for controlling the light source 3.

With reference to FIG. 5, the number 17 indicates a scenographic projector, which comprises a plurality of lighting devices 1, sharing a single frame 2 and a single control mechanism 12. In the shown case, the lighting devices are aligned and are mounted on a common base 8. The control device 12 has rods 13 and 14, which are hinged to a lever 15 at each lighting device so that the rods 13 and 14 and the levers 15 form an articulated quadrilateral.

The displacement of the control device 12 along the guides 11 allows the simultaneous adjustment of the position of all the mirrors 6 along the longitudinal axis A. Analogously, all the mirrors 6 may be simultaneously oriented by varying the configuration of the articulated quadrilateral.

In the example shown, a single linear actuator 18 is able to control the position along the longitudinal axis A of each mirror 6, and a single rotary actuator 19 is able to control the inclination of each mirror 6 with respect to the longitudinal axis A.

FIG. 6 shows a scenographic projector 20, which comprises a plurality of lighting devices 21 aligned along a common frame 22 and configured to produce scenographic light effects by manipulating the respective light beams. Each lighting device comprises a light source mounted on the frame 22; a light guide 24 coupled to the light source 23 to define a determined optical path along a longitudinal axis A; a mirror 25 arranged along the longitudinal axis A, facing the light source to reflect the light beam towards the light source 23; a mirror 26 movable with respect to the frame 2 and facing the mirror 25 to reflect the light beam reflected by the mirror 25.

As in the previous embodiment, the light source 23 comprises one or more LEDs or comprises one or more laser diodes and the optical guide 4 may have a phosphorus converter not shown in the accompanying figures.

Each lighting device 21 differs from a lighting device 1 in that the mirror 25 is a concave mirror, while the mirror 26 is a flat mirror.

The mirror 26 is provided with a central opening 27 that allows arranging the mirror 26 about the light guide 24. Moreover, each optical device 21 is provided with a projection lens 28 configured to intercept the light beam reflected by the second mirror. In the example shown, the projection lens 28 extends around the mirror 25 and simultaneously supports the mirror 25.

The frame 22 includes the same structural elements of the frame 2 and, thus, these structural elements are indicated with the same reference numbers used in the previous embodiment because they perform the same functions, although they may differ in shape.

The scenographic projector 20 further has a control mechanism 29 for controlling the position and the orientation of the mirrors 26. In the present embodiment, the control mechanism 29 comprises a rod 30 movable along the guides 11 in a direction parallel to the longitudinal axis A. The rod is moved thanks to a linear actuator 30. Furthermore, each mirror 26 is associated with a respective rotary actuator 31 to allow operating each mirror independently of the other mirrors 26 about the axis B.

In this way, all the light beams may be oriented in the same direction along respective parallel optical axes, and their respective light beams may be arranged along respective coincident optical axes.

Figure 8:
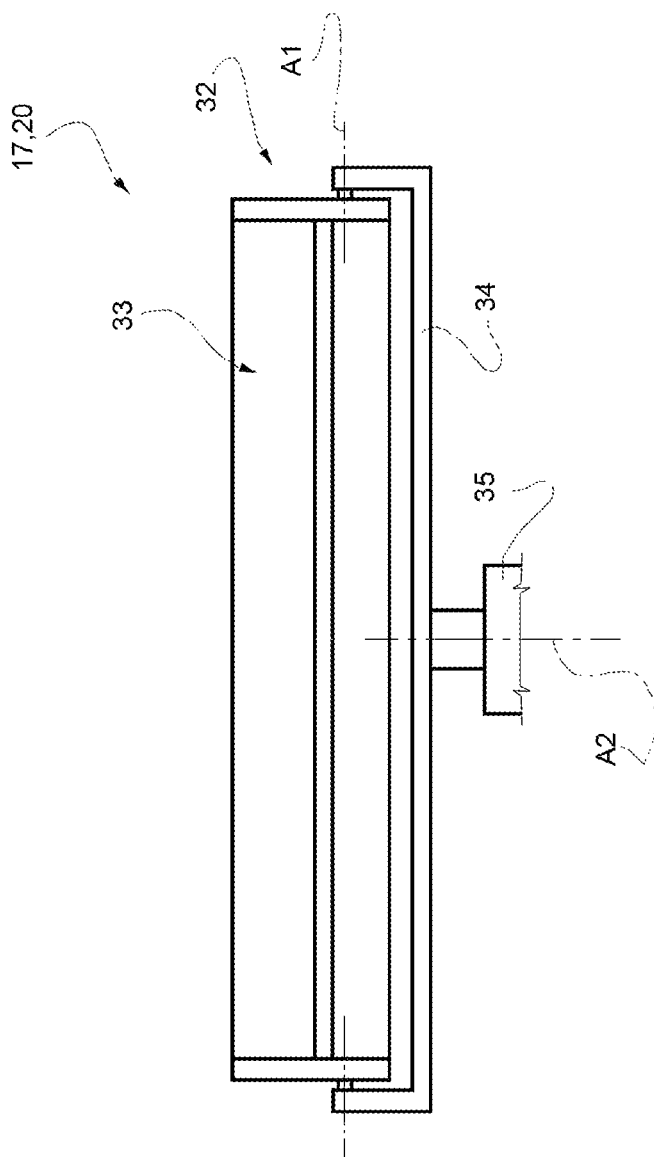
FIG. 8 is an elevational view, with parts removed for clarity's sake, of a scenographic projector comprising a plurality of lighting devices manufactured according to the present invention.

FIG. 8 shows the outer conformation of a scenographic projector 17 or 20, which comprises a shell 32 having a transparent portion 33 from which the light beams protrude. The shell 32 is hinged to a fork 34 about an axis A1. The fork 34 is, in turn, rotatably mounted about an axis A2 with respect to a base 35. These types of scenographic projectors are usually called "led bars" in the entertainment industry. The movements of the shell 32 are added to the movements of each lighting device 1 or 21 arranged within the shell 32. In particular, the shell 32 is sealed to allow an outdoor use.

Figure 9:
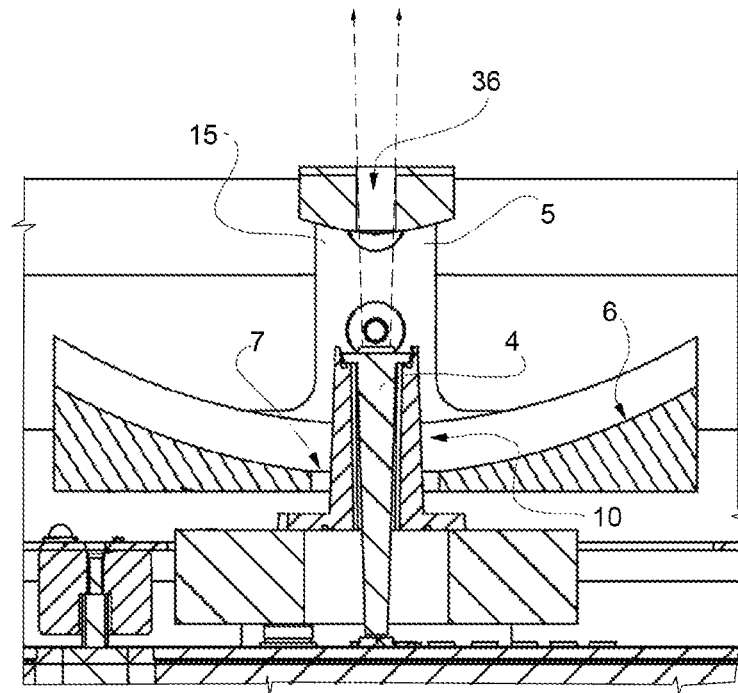
FIG. 9 is an elevational view, with parts removed for clarity's sake and parts in section, of a variant of the lighting device of FIG. 1.

According to the variant of FIG. 9, the mirror 5 of the lighting device 1 has an opening 36 that extends along the longitudinal axis A and is configured to allow the passage of a part of the light beam coming out of the light guide 4. The entire lighting device 1 has a structure that allows a part of the light beam to come out directly with no reflection, while the remaining part of the light beam is reflected by the mirrors 5 and 6. In the example shown, the opening 36 is delimited by a conical surface, which opens in the direction of propagation of the light beam.

Figure 10:
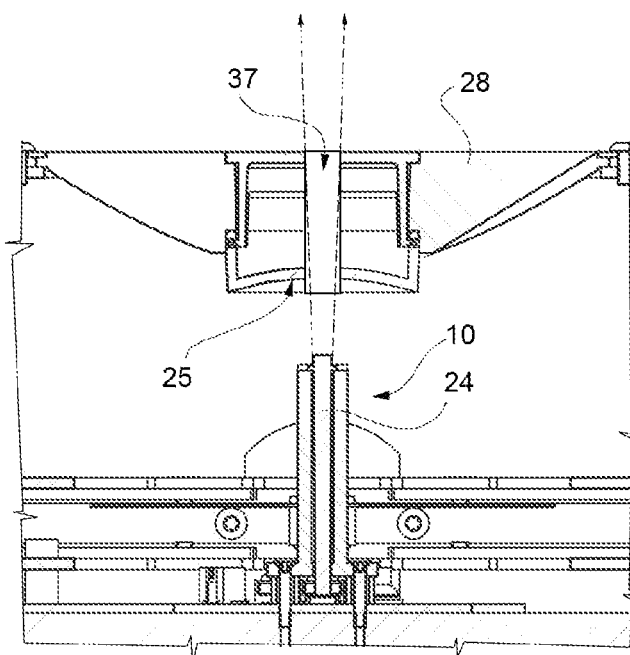
FIG. 10 is an elevational view, with parts removed for clarity's sake and parts in section, of a variant of the lighting device of FIG. 6.

Analogously and with reference to the variant of FIG. 10, the lighting device 21 has an opening 37 through the mirror 25.

Figure 11:
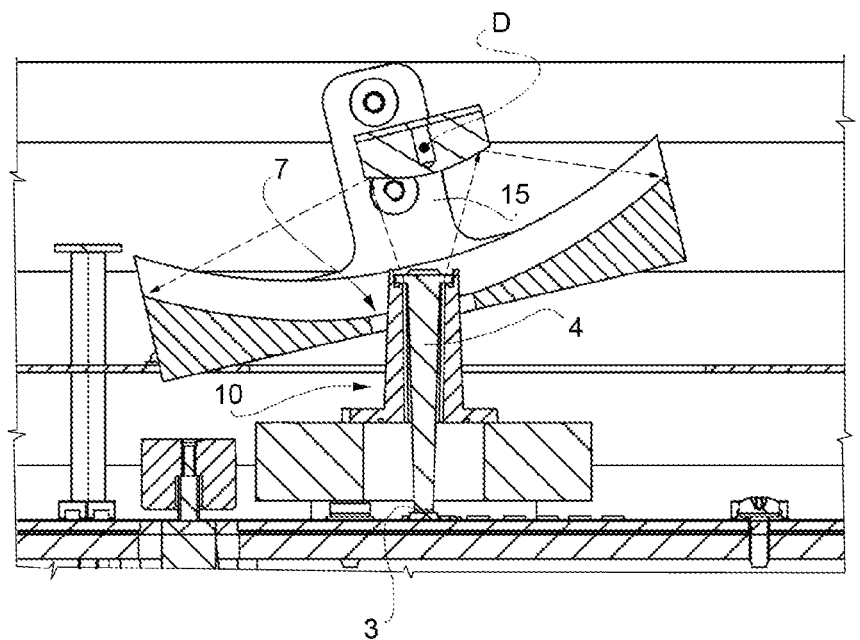
FIG. 11 is an elevational view, with parts removed for clarity's sake and parts in section, of a further variant of the lighting device of FIG. 1.

With reference to the variant of FIG. 11, the lighting device 1 is configured to direct the first mirror 5 about a third axis D transverse to the longitudinal axis A and parallel to the first axis B. In particular, the rotation of the first mirror 5 is opposite to the rotation of the second mirror 6.

Figure 12:
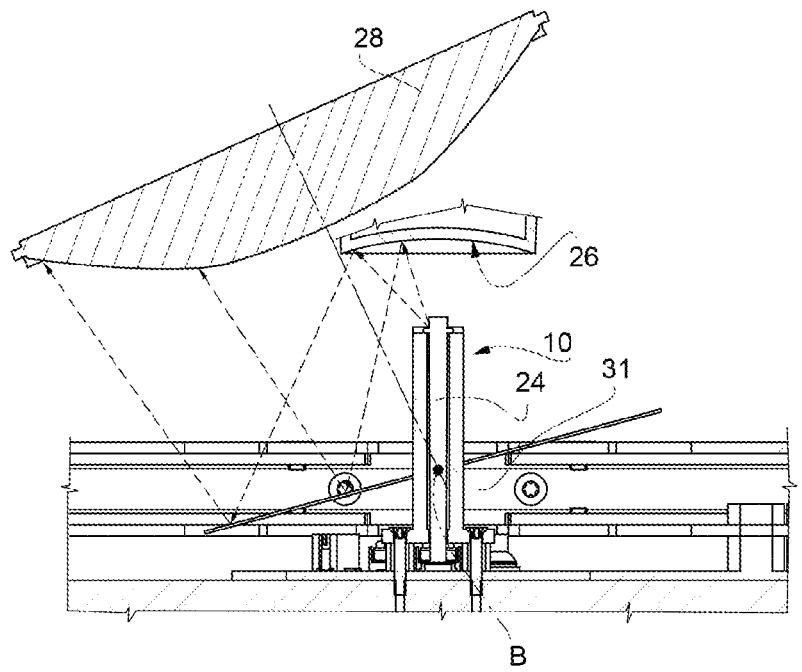
FIG. 12 is an elevational view, with parts removed for clarity's sake and parts in section, of a further variant of the lighting device of FIG. 6.

With reference to the variant of FIG. 12, the lighting device 21 is configured to rotate the projection lens 28 about the axis B. In particular, the rotation of the projection lens 28 is concordant with the rotation of the second mirror 26 and larger than the rotation of the second mirror 26. In particular, the angle of rotation of the projection lens 28 is twice the angle of rotation of the second mirror 26.

Figure 13:
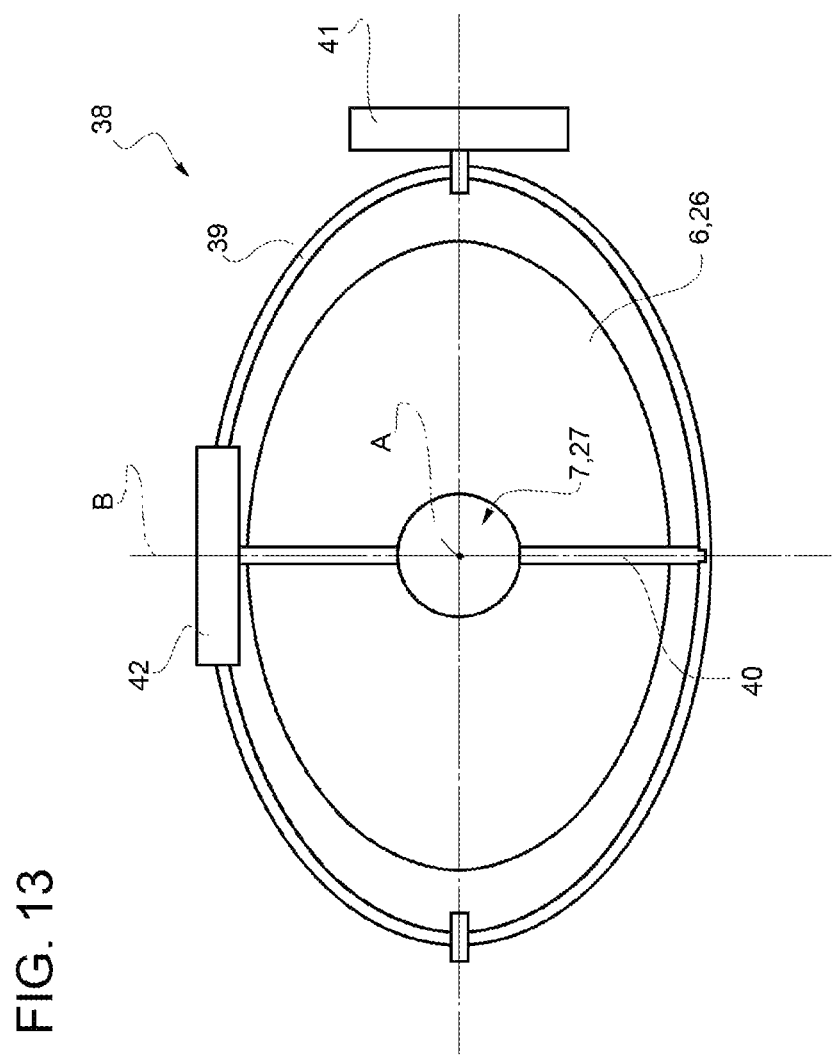
FIG. 13 is a schematic plan view of a control mechanism configured to direct the movements of lighting devices.

With reference to FIG. 13, 38 indicates an actuation assembly, which is used for moving the mirrors 6 or 26 about the axis B and about an axis E which, in the present embodiment, is perpendicular to the axis B and to the longitudinal axis A. The actuation assembly 38 allows tilting the mirrors 6 or 26 in any direction with respect to the longitudinal axis A by composing the rotations about the axes B and E. In the example shown, the actuation assembly 38 comprises a ring 39 rotatably mounted about the axis E with respect to the control mechanism 12 or 29 (FIGS. 5 and 6); a shaft 40 fixed to the mirror 6 or 26 and rotatable relative to the ring 39 about the axis B; an actuator 41 to rotate the ring 39 about the axis E; and an actuator 42 to rotate the ring 39 about the axis B.

The actuation assembly 38 can also be used to rotate the mirror 5 (FIG. 11) and the projection lens 28 (FIG. 12).

Finally, it is evident that the object of the present invention may be subject to further modifications and variants without departing from the scope of the appended claims.

The invention claimed is:

1. A lighting device for producing scenographic light effects; the lighting device comprising a frame; a light source mounted on the frame and generating a light beam; a light guide coupled to the light source to define an optical path along a longitudinal axis (A); a first mirror arranged along the longitudinal axis (A) and facing the light source to reflect the light beam towards the light source; a second mirror movable with respect to the frame and facing the first mirror to reflect the light beam reflected by the first mirror.

2. The lighting device according to claim 1, wherein the second mirror has a central opening to be arranged about the light guide.

3. The lighting device according to claim 1, wherein the second mirror is movable along the longitudinal axis (A) for varying the distance between the first mirror and the second mirror and for varying the opening of the light beam reflected by the second mirror.

4. The lighting device according to claim 1, wherein the second mirror can be tilted with respect to the longitudinal axis (A) to direct the light beam reflected by the second mirror in a direction diverging from the longitudinal axis (A).

5. The lighting device according to claim 1, wherein the first mirror has an opening, which extends along the longitudinal axis (A) and is configured to allow the passage of a part of the light beam coming out of the light guide.

6. The lighting device according to claim 1, wherein the first mirror can be tilted with respect to the longitudinal axis (A), in particular the rotation of the first mirror is opposite to the rotation of the second mirror.

7. The lighting device according to claim 1 and comprising a projection lens configured for intercepting the light beam reflected by the second mirror.

8. The lighting device according to claim 7, wherein the projection lens can be tilted with respect to the longitudinal axis (A), in particular the rotation of the projection lens is coaxial to and concordant with the rotation of the second mirror and larger than the rotation of the second mirror.

9. The lighting device according to claim 1, wherein the first mirror is a convex mirror.

10. The lighting device according to claim 1, wherein the second mirror is a concave mirror.

11. The lighting device according to claim 1, wherein the first mirror is a concave mirror.

12. The lighting device according to claim 11, wherein the second mirror is a flat mirror.

13. The lighting device according to claim 1, wherein the frame comprises a base for supporting the light source and a structure integral with the base and configured for supporting the first mirror facing the light source.

14. The lighting device according to claim 1, wherein the frame comprises a tubular member integral with the base and configured for housing the light guide.

15. The lighting device according to claim 1, wherein the frame comprises guides parallel to the longitudinal axis (A).

16. The lighting device according to claim 1 and comprising a control mechanism movable with respect to the frame and configured for supporting and displacing the second mirror along the longitudinal axis (A) and for tilting the second mirror with respect to the longitudinal axis (A).

17. The lighting device according to claim 1 and comprising at least a first actuator for displacing the second mirror along the longitudinal axis (A) and at least a second actuator for orienting the second mirror with respect to the longitudinal axis (A).

18. The lighting device according to claim 1, and comprising an actuation assembly for rotating the second mirror about two mutually incident axes (B, E), transverse to the longitudinal axis (A).

19. A scenographic projector for producing scenographic light effects, the scenographic projector comprising a plurality of lighting devices, each of which is made according to claim 1.

20. The scenographic projector according to claim 19, wherein the second mirrors of the plurality of lighting devices are simultaneously actuated.

21. The scenographic projector according to claim 19, wherein the second mirrors of the plurality of lighting devices are actuated independently of each other.

22. The scenographic projector according to claim 1, wherein the light source and the light guide are coaxially arranged with respect to one another.

23. A lighting device for producing scenographic light effects; the lighting device comprising a frame; a light source mounted on the frame and generating a light beam; a light guide coupled to the light source to define an optical path along a longitudinal axis (A); a first mirror arranged along the longitudinal axis (A) and facing the light source to reflect the light bean towards the light source; a second mirror movable with respect to the frame and facing the first mirror to reflect the light beam reflected by the first mirror, wherein the second mirror is located between the light source and the first mirror for controlling a direction of the light beam by moving only the second mirror.

* * * * *